United States Patent Office.

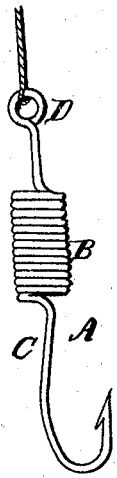

BENJAMIN LEE, JR., OF WILLIAMSBURG, NEW YORK, ASSIGNOR TO HIMSELF AND ALFRED WOODHAM, OF NEW YORK, N. Y.

Letters Patent No. 62,042, dated February 12, 1867.

IMPROVEMENT IN FISH-HOOKS.

The Schedule referred to in these Letters Patent and making part of the same.

TO ALL WHOM IT MAY CONCERN:

Be it known that I, BENJAMIN LEE, Jr., of Williamsburg, county of Kings, and State of New York, have invented a new and useful improved Fish-Hook; and I do hereby declare that the following is a full, clear, and exact description thereof, which will enable others skilled in the art to make and use the same, reference being had to the accompanying drawings, forming part of this specification.

The present invention consists in combining with the shank portion or stem of a fish-hook, a spiral, coiled, or other suitable spring, whether such spring forms a part of the hook itself, or is separate from and attached or connected with it in any suitable manner, the object of the spring being to increase the strength of the hook without materially increasing its weight, as well also as to render it sufficiently flexible to resist sudden strains, which, in hooks of the ordinary form or construction, oftentimes causes them to break.

In the accompanying plate my improved fish-hook is illustrated, the figure being a side view of the same.

A, in the drawings, represents the fish-hook, which, except so far as the present invention extends, may be made of any of the ordinary forms and styles. B the spring, which, in the present instance, is of a spiral or coiled shape, and forms a part or continuation of the shank or stem portion C of the hook, terminating in an eye, D, by which it is to be secured or fastened in any proper manner to the fishing-line. By interposing a spring, B, between the hook and its point of connection with the fishing-line, as above explained, the hook is rendered much more flexible, and thus enabled to resist any sudden strain or "jerk" without danger of breaking; and, furthermore, is greatly increased in its strength, the spring also serving to assist the drawing or pulling in of a fish when caught upon the hook by its reaction from time to time. In lieu of making the spring a part of the hook itself, it may be independent of the same and attached or connected to it in any suitable manner between it and the line; and, furthermore, the shape of the spring may be varied in many respects.

Having thus described my invention, I claim as new, and desire to secure by Letters Patent—

A spring, B, or its equivalent, in combination with a fish-hook, substantially as and for the purpose described.

The above specification of my invention signed by me this 26th day of October, 1866.

BENJAMIN LEE, JR.

Witnesses:
   WM. F. MCNAMARA,
   ALBERT W. BROWN.